United States Patent [19]

Sutton

[11] 4,103,788

[45] Aug. 1, 1978

[54] APPARATUS FOR DISCHARGING FROM A SILO

[76] Inventor: William H. Sutton, P.O. Box 18793, Fort Worth, Tex. 76118

[21] Appl. No.: 809,293

[22] Filed: Jun. 23, 1977

[51] Int. Cl.² .......................................... B65G 65/46
[52] U.S. Cl. ................................ 214/17 DA; 198/661
[58] Field of Search ................... 214/17 DA, 17 DB; 198/661

[56] References Cited

U.S. PATENT DOCUMENTS

| 826,139 | 7/1906 | Brookfield | 198/661 X |
| 2,969,156 | 1/1961 | Miller et al. | 198/661 X |
| 3,259,538 | 7/1966 | Schnyder | 214/17 DA |
| 3,403,795 | 10/1968 | Schaefer | 214/17 DA |
| 3,539,058 | 11/1970 | Ferris | 214/17 DA |
| 3,896,943 | 7/1975 | Knutsen | 214/17 DA |

Primary Examiner—Albert J. Makay

Attorney, Agent, or Firm—Wofford, Felsman, Fails & Zobal

[57] ABSTRACT

Apparatus for unloading from the bottom of a silo having a conventional horizontal floor with a central opening characterized by apparatus extending from the pit radially outwardly for removal of the material and at least one radial sweep auger having its interior end within the pit with its outer adapted for powered rotational movement, the auger having a tapered central shaft that is larger adjacent its exterior end than adjacent its interior end such that the flights of auger blade may be uniformly spaced and pick up material along its full length, since each will handle progressively greater quantities of material near the center, for uniform withdrawal from storage. Also disclosed are the details of specific drive means, track clearing means and other equipment in a preferred embodiment.

1 Claim, 8 Drawing Figures

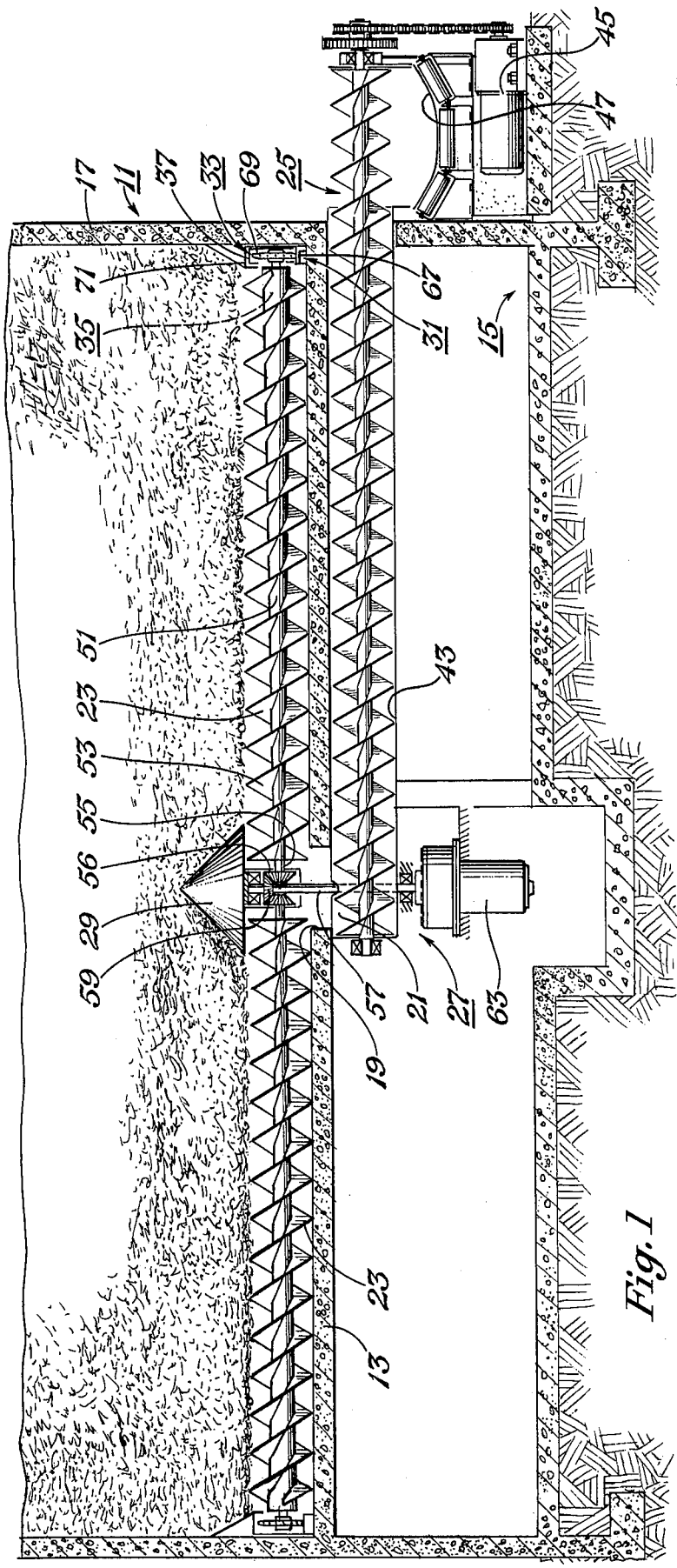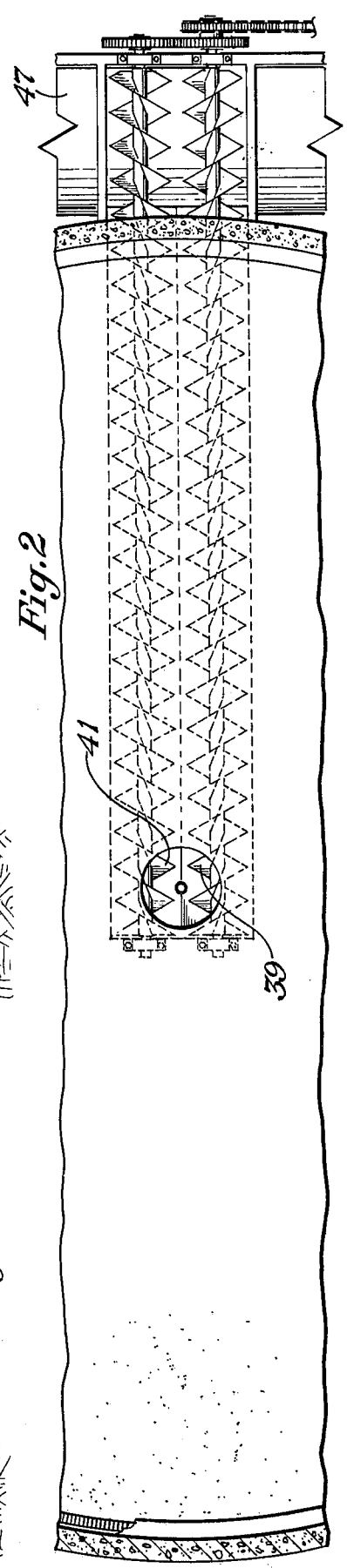

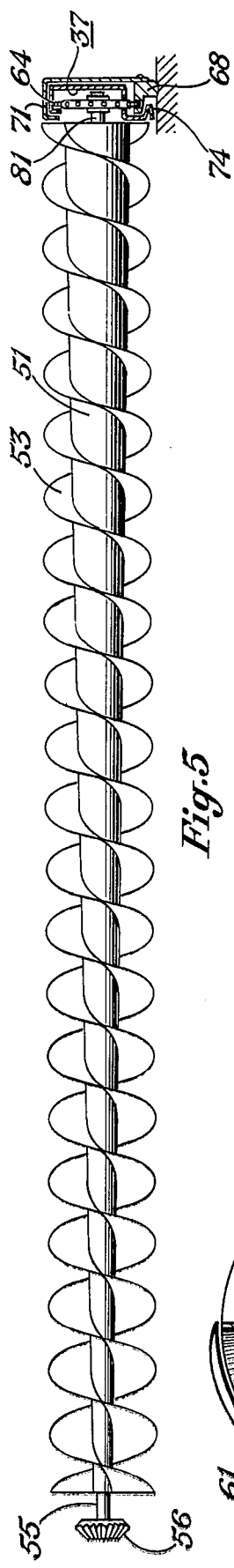
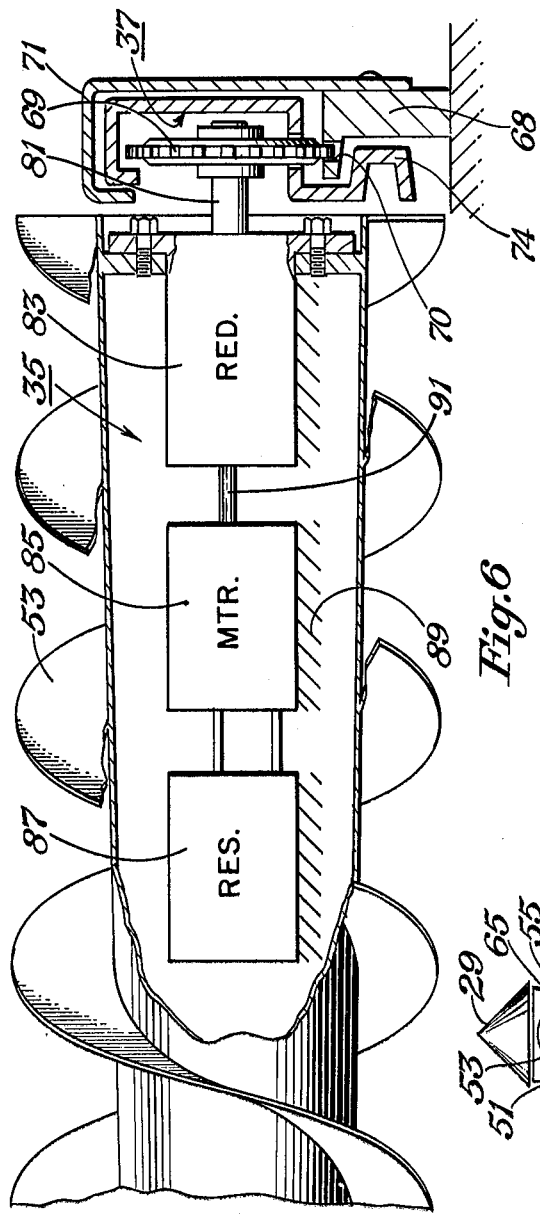
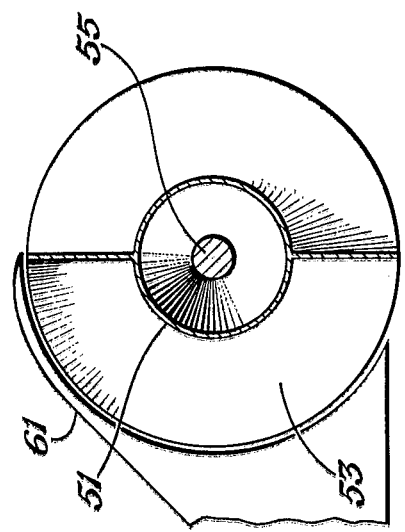
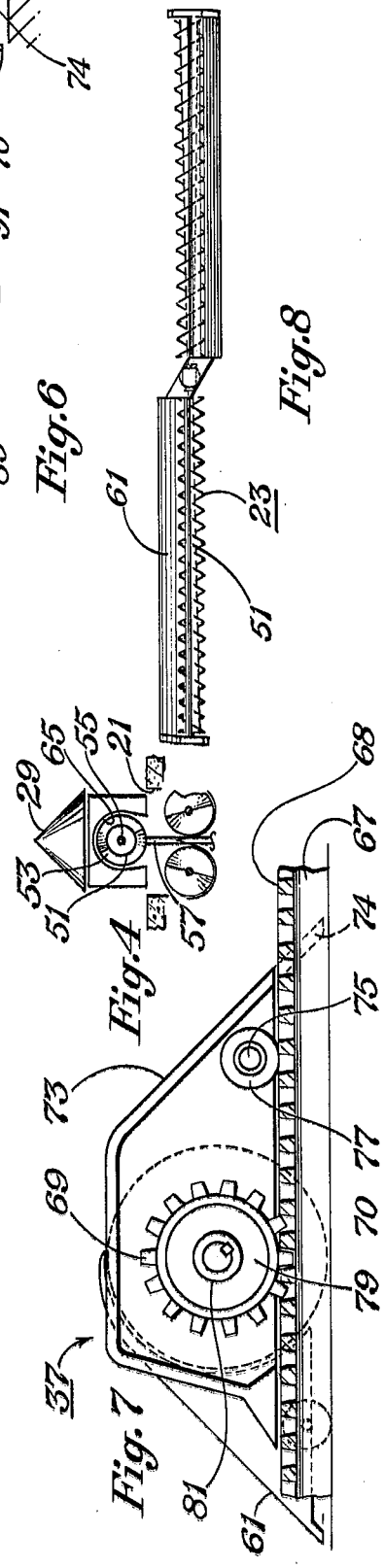
Fig.5  Fig.6  Fig.8  Fig.3  Fig.4  Fig.7

APPARATUS FOR DISCHARGING FROM A SILO

BACKGROUND OF THE INVENTION

1. Field of the Invention:

The present invention relates to apparatus for unloading the material from storage, such as a silo. More particularly, this invention relates to a silo discharging device with a conveying element leading to a discharge opening and means for unloading substantially uniformly across the bottom of the silo.

2. Description of the Prior Art:

As is known, material, such as silage and the like, is frequently stored in upright cylindrical storage containers known as silos. The material that is fed into the silos is frequently compacted to a considerable extent such that removal is difficult with the prior art devices.

The prior art devices for unloading a silo have been varied. They have included the crude windows in the side of the cylindrical wall to allow access to the interior for manual unloading. This has required means for ingress and egress from the respective windows in the walls and required manual labor for the unloading. Attempts to employ augers extending from the top downwardly into the silage has not proven successful. A more successful approach has been the use of bottom unloaders in which one or more radially extending augers, or auger cutting arms, have traversed around the bottom of the silo for unloading from the bottom the silage and the like. In the past, these augers have had uniformly spaced flights thereon such that flights at the radially exterior end of the auger were always filled. Consequently, no further silage was removed near the center and the augers tended to stall for lack of feeding material. Frequently, there occurred bridging with the center material piling up on the housing or the like. Conversely, there occurred frequently a caving of the material with uneven unloading of the silo.

The devices that have been employed for bottom unloaders have ranged from that described in early U.S. Pat. No. 1,274,548 with the radially extending augers having uniformly spaced flights through powered means such as described in U.S. Pat. No. 3,356,235, also having uniformly spaced flights on the auger; to U.S. Pat. No. 3,266,117 having rotary motor driven cutters located above the conveying element to try to solve this problem. U.S. Pat. No. 3,666,117 also employed unevenly spaced flights with the very expensive approach of having to taper the floor of the silo, or other elaborate means to try to obtain a solution to the problem.

As will be apparent from the foregoing, the prior art has not provided totally satisfactory apparatus for storing and unloading the stored material from the bottom of a silo and the like.

SUMMARY OF THE INVENTION

Accordingly, it is an object of this invention to provide apparatus that obviates the disadvantages of the prior art and unloads substantially uniformly across the bottom of material stored in a silo and the like.

It is another object of this invention to provide apparatus that allows installation in a conventional silo having a substantially horizontal floor and that will unload uniformly across the bottom of the stored material in the silo and the like, while obviating the disadvantages of the prior art apparatuses.

These and other objects of this invention will become apparent from the descriptive matter and the drawings hereinafter.

In accordance with this invention, there is provided apparatus for unloading from the bottom a silo having a conventional horizontal floor with a central opening and pit having a removal auger extending outwardly from the pit for removing the stored material from the pit once it is brought to the pit. To bring it to the pit there is at least one and preferably a plurality of radial sweep augers. Each radial sweep auger has its interior end within the area defined by the pit, preferably above the pit, for moving the stored material to the pit to be taken exteriorly of the silo. The auger has a rotating apparatus, such as gear and motor, with a housing thereabove for protection from the stored material. Each auger also has a tapered central shaft that is larger adjacent its exterior end than adjacent its interior end. Consequently, the flights of the auger blade may be uniformly spaced but will handle progressivly greater quantities of material near the center so as to pick up material all the way from outside to the center for uniform withdrawal of the stored material from the bottom, in contrast to the prior art approaches or apparatuses.

In another aspect, this invention provides specific and preferred means for advancing the auger around the track disposed at the outer radial portion of the floor, with track clearing means and the like.

A BRIEF DESCRIPTION OF THE DRAWINGS

FIG. 1 is a partial side elevational view, partly in section, showing one embodiment of this invention.

FIG. 2 is a partial plan view of the embodiment of FIG. 1, partly cut away to show the underlying removal means.

FIG. 3 is a partial cross sectional view of the sweep auger and sloped follower.

FIG. 4 is a partial side elevational view of the housing means at the central pit in the embodiment of FIG. 1.

FIG. 5 is a partial side elevational view of the auger showing the tapered shaft of the radial augers of FIG. 1.

FIG. 6 is a schematic view of the shaft of the embodiment of FIG. 1 showing the advancing means and the track means.

FIG. 7 is a partial end view of the embodiment of FIG. 1 showing the track and a portion of the advancing means of the embodiment of FIG. 6.

FIG. 8 is a plan view of the auger showing the follower arms for locking the augers in their 180° relationship such that they advance uniformly.

DESCRIPTION OF THE PREFERRED EMBODIMENTS

Referring to the drawings in detail and particularly to FIG. 1, the silo 11 has a floor 13 that is substantially level. The silo 11 has a base 15 supporting the floor 13 and the cylindrical walls 17 connected with the floor 13. The floor 13 has a central opening 19.

A pit 21 is disposed beneath the central opening for receiving silage and the like from within the silo responsive to its being moved to the central opening.

To effect the movement of the silage toward the central opening, there is provided at least one radial sweep auger 23. Preferably two radial sweep augers 23 are provided, each disposed 180° with respect to the other so as to extend substantially completely across the silo.

The silo unloader combination includes a removal means 25 extending from the pit radially outwardly exteriorly of the cylindrical wall 19 of the silo 11 for removing the stored material after it has been brought to the pit 21. The silo unloading apparatus also includes a rotation means 27 operationally effecting rotation of the auger; housing means 29 protecting the rotation means 27; a track means 31 for providing traction for advancing exterior end of the sweep auger 23; advancing means 33 connected with the exterior end of the auger 23 and the track means 31 for advancing the auger; torque inducing means 35 for generating a torque inversely proportional to the speed of advancement of the auger; and a track clearing means 37 for maintaining the track clear of silage and the like.

The silo 11 may have any of the conventional forms of construction. Ordinarily, it would have concrete walls that may be coated interiorly with epoxy or other slick material to reduce the friction between the wall and the storage material, such as silage. Consequently, the silage will move downwardly as support is removed from the bottom. The silo 11 will ordinarily have a steel reinforced concrete floor 13 and a concrete foundation serving as the base 15 for the concrete walls 17 and floor 13.

Ordinarily, the central opening 19 is formed when the floor is poured. The pit 21 is formed at the same time. The pit 21 may, however, take the form of steel or the like that is emplaced to serve as a silage discharge hopper for discharging the silage to the removal means 25.

The illustrated removal means 25 comprises dual augers 39 and 41, FIG. 2, that are disposed in a subfloor trench 43, FIG. 1. The augers are powered by a suitable means such as motor 45. The augers are counter rotating augers and serve to move the silage or the like from the central pit 21 exteriorly of the silo 11. Of course, a single auger or other means can be employed to discharge the stored material exteriorly of the silo. As illustrated, the silage or stored material is discharged onto conveyor belt 47 for movement elsewhere. If desired, of course, it can be discharged into any suitable means for transporting it, such as trucks or the like. The respective augers 39 and 41 are conventional augers having equal flights spaced about a shaft of uniform diameter for even flow of the silage exteriorly of the silo. The shafts of the augers 39 and 41 are journalled in suitable bearing and support means for sustaining their rotation under load. These types of augers are well known, do not per se, form a part of this invention and need not be detailed herein. They serve to remove the silage or the like that are brought to the pit by the sweep auger 23.

The sweep auger 23, FIGS. 1, 2, and 3, has been a source of difficulties in the prior art, as indicated hereinbefore. In this invention, the sweep auger 23 has an internal shaft 51 that is tapered, with its larger end being near the radially exterior portion of the auger. For example, the tapered shaft may be as large as 12 inches at its exterior end and may support a 14 inch auger. As will be appreciated, the auger will eat the material from in front of it so as to advance into the material. The shaft 51 is hollow for economy and convenience but is structurally adequate to transmit the torque that is needed. The exterior ribbon 53 defining the flights on the sweep auger 23 is spaced substantially uniformly but is progressively radially wider from the exterior end to the interior end. This allows one mold to be formed such that the flights can be slipped onto the tapered shaft and affixed, as by welding for ease of manufacture. This is in contrast to trying to employ unevenly spaced flights on the auger. Yet, this allows the respective flights to pick up an additional increment of silage or the like substantially uniformly across the bottom. This effects much smoother, more nearly even unloading than did the prior art apparatus that required starving the outer flights before inner flights could pick up silage; since, otherwise, they were full — with the bridging and stalling described hereinbefore.

As indicated hereinbefore, preferably there are two augers extended 180° with respect to each other. Each auger 23 has its interior end adjacent the pit and is connected with rotation means 27 for effecting rotation about the longitudinal axis of the auger 23. Specifically, as illustrated in FIG. 4, the interior end 55 of the shaft 51 is connected into a gear box, as by a bevel gear 56, so as to be rotatable responsive to torque from a powered shaft 57 and bevel gear 59. The bevel gear 59, of course, is powered by suitable means, such as electric motor 63 or the like. The motor 63 may range from 1–10 horse power depending upon the size of the silo. For example, a 7½ horse power electric motor has been found adequate to power the rotation of the shaft 51 of the sweep augers 23 and the respective advancing means and torque inducing means 33 and 35. The electrical connections are explosion proof to prevent the danger of explosion in the event that dry material is stored. Suitable grease fittings are provided with readily accessible means for greasing the mechanical connections. For example, the gear boxes may be sealed with a lubricant therewithin, with or without an exterior means of adding lubricant exteriorly of the silo 11. With this approach, the shafts of the respective augers tend to rotate substantially the same orbital speed so as to maintain the 180° disposition of the sweep augers. As illustrated in FIG. 8, a follower 61 is provided behind the respective augers 23. The follower 61 is sloped rearwardly, FIGS. 3 and 7, so as to impart forward motion responsive to the weight of silage thereon. The follower 61 also assists in maintaining the 180° spacing by transferring torque from one auger to the other in the event that there is a slowing down of the exterior end of one auger because of differences in material consistency or the like. This assists in maintaining uniform withdrawal and allows the silage to slip relatively continuously downwardly for substantially uniform withdrawal.

The rotation means 27 may comprise, alternately, belt driven units. Either type of drive does not, per se, form part of this invention and need not be described in further detail herein. It is sufficient to note that the controls (not shown), such as the on-off switches for the motor, are provided exteriorly of the silo for intermittent operation as desired.

The housing means 29 are supported above the central opening and the rotation means 27 for protecting it from the descending silage or the like. As illustrated, the housing means 29 comprises a conical shaped spinner that sheds the silage off to the side where it is picked up by the augers 23. The housing means 29 has an opening 65 on its side through which extends the auger shaft 51 and the respective ribbon flights 53 extending from the interior end 55, FIG. 4.

The track means 31 is disposed peripherally about the floor of the silo adjacent the cylindrical wall. The track means includes a preformed mounting strip 67, FIG. 1, having a cantilevered perforated, or serrated, portion with which the drive teeth 69, FIGS. 6 and 7, of the advancing means 33 may engage. The track means 31 may be attached to the floor 13 by any of the conventional means. These conventional means take the form of explosively driven in fasteners, bolts through the floor, and the like. The perforated or serrated portion 68 of the track means may comprise a rack for engagement by a pinion or a plurality of evenly spaced apertures for engagement by the teeth of a sprocket wheel, as desired. Preferably, the perforations, or apertures, are employed. With the perforations 70 the teeth 69 force through any debris, such as silage or the like, to keep the track means 31 clear. Since the perforated portion is cantilevered, the debris that is pushed through is cleared away by the track clearing means 37, as described in more detail hereinafter. As can be seen in FIGS. 5, and 6, the track strip 67 is preferably covered by the track cover 71 to minimize the amount of silage, debris and the like falling onto and blocking the track. The track cover 71 may be a part of the mounting strip or may be attached separately by its own attachment means in a similar manner. In any event, it minimizes the work and amount of debris that has to be cleared away by the track clearing means.

The track clearing means 37 is analogous to the clearing means on the old trains in providing a downwardly and forwardly sloping runner 73, with cantilevered undersling 74, FIGS. 6 and 7, that pushes aside any silage or the like that would tend to block the track, particularly the mounting strip 67. The housing serving as the runner 73 is supported by way of axle 75 on roller 77. As can be seen in FIG. 6, the track clearing means 37 is disposed inside of the track cover 71 so as to move therewithin as the exterior end of the aguer 23 is caused to move by the advancing means 33.

The advancing means 33 includes a toothed pinion 79 having the teeth 69 for engaging the track strip 67 to provide positive traction for advancing the outer cylindrical end of the respective auger arms, or augers 23. As is clear from the drawing, the pinion 79 is caused to rotate by power shaft 81. The pinion 79 and power shaft 81 support the exterior end of the auger by being journalled in suitable support and engage the track means 31 for the support of the exterior end of the auger. Because of the weight on the pinion 79, it is not necessary to constrain it to engage the track strip 67. If desired, however, a constraining means, such as roller and flange, can be employed to so constrain the pinion 79.

The advancing means 33 is powered by torque inducing means 35 for advancing the exterior end of the auger 23 around the track means 31. In the past, a separate motor has been employed for torque inducing means. This, however, introduces a separate control problem to keep the torque coordinated with the rotational speed of the auger 23 and to prevent inducing too much strain and overheating one or the other of the power supply means rotating the auger and advancing the auger. In preferred embodiment of this invention, the pinion 79 has its power shaft 81 connected by way of gear reducer 83 to a hydraulic motor means, or pump, 85, FIG. 6. The illustrated hydraulic motor means 85 is a conventional variable volume-constant pressure hydraulic pump that has fluid connections with a hydraulic reservoir 87, but has its normal fluid outlet port plugged except for a minor amount of seepage, so as to develop a constant torque during rotation. The reservoir, motor and gear reducer are connected with the shaft 51 internally of auger 23 by suitable means, illustrated by the hatching 89. Consequently, their cases rotate at the same rotational speed as does the shaft 51. The motor 85 with its output vents plugged will develop the requisite rotational speed of its shaft 91 to the gear reducer 83. To bring material to the center of the storage bin, the auger shaft 51 is rotated and the pinion 79 is caused to roll in the same direction. The pinion 79 advances its orbital travel around the bottom of the storage bin. To advance in orbital travel while bringing matter to the bin center is much slower than the pinion would make it travel if there were no (material) silage in the bin. Consequently, different rotation is set up within the pump. The pump wobble plate is slidable to maintain the desired pressure, and continues to maintain a constant internal pressure and constant forward torque on the pinion 79 whether the orbital advance is relatively slow or fast. It can be seen that this will compensate for varying densities or homogenity of the silage or the like.

In the illustrated embodiment, the sloped follower 61 also serves as part of the advancing means by imparting a forward force component responsive to the force normal to the slanted surface as silage falls thereonto.

In operation, the apparatus is installed as described hereinbefore. The switches are energized to activate the motor 45 for powering the augers of the removal means. The motor 45 may comprise, for example, a 3 horse power electric motor. On the other hand, 4½ or even 5 horse power may be employed if desired.

Next the switch is closed to energize the motor 63 powering the sweep augers 23. Consequently, the augers 23 begin to rotate and to traverse angularly about the floor of the silo 11 as they rotate. Consequently, silage is drawn inwardly along the sloping shaft 51. Since the shaft slopes radially inwardly toward its longitudinal axis, additional silage may be picked up by the flights, or ribbons 53, to provide a uniform withdrawal of the silage from the bottom of the storage silage and into the central pit 21. The rotating augers 39 and 41 carry the silage exteriorly onto conveyor belt 47 or the like. As indicated hereinbefore, the augers 23 are rotated and orbited uniformly. As silage is encountered, the augers 23 rotate and cut into the silage at the front. Constant torque is transmitted from the hydraulic motor by way of the gear reducer 83 to achieve the advancement of the augers 23 and each auger 23 is caused to bite into silage that is in front of it. The respective register sloped followers 61 also impart forward motion and lateral stiffness so as to maintain the 180° alignment of the respective augers 23.

As silage is removed from the bottom, the remaining silage tends to slip downwardly in the silo and the bottom strata is again removed as the augers continue their orbital sweep.

When the desired amount of silage has been removed, the respective switches are stopped to stop operation of the respective augers.

The torque inducing means of the preferred embodiment has been described as comprising a hydraulic motor for employing the rotational speed differential between the power shaft 81 and the shaft 51 of the sweep auger for generating the constant torque. If desired, suitable mechanical interconnections with suitable gear reducers can be employed to translate the rotational speed of the shaft 51 directly into the correct rotational speed of the power shaft 81 and the pinion 79 for traversing around the track means 31. The hydraulic interconnection is preferable, however, since it allows tolerance to variations greater than would be allowed by a direct mechanical interconnection.

While the interconnection of the respective torque inducing means and the advancing means has been described hereinbefore with respect to a rigid interconnection, suitable splined shafts or other means for compensating for engineering irregularities in the traverse of the track means may be employed as desired.

From the foregoing it can be seen that this invention provides the objects delineated hereinbefore. More particularly, it provides apparatus for unloading conventional silo or the like without requiring sloping floors such as would be necessitated by tapered augers or the like. The apparatus also obviates the disadvantages of the prior art apparatuses.

Although the invention has been described with a certain degree of particularity, it is understood that the present disclosure is made only by way of example and that numerous changes in the details of construction and the combination and arrangement of parts may be resorted to without departing from the spirit and scope of this invention.

What is claimed is:

1. A silo and unloader combination comprising:
    a. a silo having a substantially horizontal floor with a central opening therewithin and having a cylindrical wall extending above said floor and connected therewith;
    b. a pit at said central opening for receiving silage and the like from within said silo responsive to a radial sweep auger moving said silage toward said central opening;
    c. removal means extending from said pit radially outwardly exteriorly of the cylindrical wall of said silo;
    d. at least one radial sweep auger having its interior end adjacent said pit and having its interior end adapted for connection with a rotation means for effecting rotation about the longitudinal axis of said auger; said auger having its exterior end near said cylindrical wall of said silo; said radial auger having a tapered central shaft that is larger adjacent its exterior end than adjacent its interior end and having substantially uniformly spaced flights of auger blades extending rotationally and peripherally exteriorly of said shaft for drawing in respectively increasing amounts of silage and the like along the interiorly spaced flights as compared with the exteriorly spaced flights for preventing bridging of the silage and keeping it flowing into the front of said auger for being moved toward the central opening;
    e. rotation means disposed in said pit and connected with said at least one auger and operationally effecting rotation thereof;
    f. housing means disposed over said rotation means for protecting said rotation means;
    g. track means disposed peripherally about the floor of said silo and adjacent said cylindrical wall;
    h. advancing means connected with the exterior end of said at least one auger and engaging said track means; said advancing means including support means supporting a free end of said auger and including a toothed drive means for engaging said track means;
    i. torque inducing means for utilizing differential rotational speed between the toothed drive means of said advancing means and the shaft of the auger to generate a torque to cause the auger to move into the silage; said torque inducing means for utilizing differential rotational speed between said toothed drive means of said advancing means and said shaft of said auger comprising a hydraulic reservoir and hydraulic motor means with an output shaft and with its casing connected with said shaft of said auger so as to spin at the same speed as said shaft; said toothed drive means for engaging said track means comprising a sprocket gear that is connected via gear reducer with the output shaft of said hydraulic motor means such that substantially constant torque is developed to force said auger to advance into said silage and the like; and
    j. a track clearing means on the exterior end of said auger for displacing material from said track means into the path of said radial auger and off said track means.

* * * * *